US010102219B2

(12) United States Patent
Ebberson et al.

(10) Patent No.: US 10,102,219 B2
(45) Date of Patent: Oct. 16, 2018

(54) RENDERING HIGH RESOLUTION IMAGES USING IMAGE TILING AND HIERARCHICAL IMAGE TILE STORAGE STRUCTURES

(71) Applicant: Box, Inc., Los Altos, CA (US)

(72) Inventors: Cody D. Ebberson, San Francisco, CA (US); Reshma K. Ebberson, San Francisco, CA (US)

(73) Assignee: Box, Inc., Redwood City, CA (US)

( * ) Notice: Subject to any disclaimer, the term of this patent is extended or adjusted under 35 U.S.C. 154(b) by 487 days.

(21) Appl. No.: 14/719,758

(22) Filed: May 22, 2015

(65) Prior Publication Data

US 2016/0342620 A1 Nov. 24, 2016

(51) Int. Cl.
*G06F 17/30* (2006.01)

(52) U.S. Cl.
CPC .... *G06F 17/30221* (2013.01); *G06F 17/3028* (2013.01); *G06F 17/30123* (2013.01); *G06F 17/30203* (2013.01)

(58) Field of Classification Search
None
See application file for complete search history.

(56) References Cited

U.S. PATENT DOCUMENTS 6,396,941 B1 * 5/2002 Bacus .................... G01N 1/312
382/128
9,529,812 B1 * 12/2016 James ............... G06F 17/30106
2009/0317010 A1 * 12/2009 Gerhard ............... H04N 19/162
382/240
2014/0193047 A1 * 7/2014 Grosz ................... G06F 3/1242
382/118

OTHER PUBLICATIONS

Marks, M., "Creating super-overlays with gdal2tiles", Google GEO APIs Team, URL: https://developers.google.com/kml/articles/raster, Sep. 2009.

"Tile Layers", Google Maps SDK, URL: https://developers.google.com/maps/documentation/ios/tiles, Apr. 2005.

* cited by examiner

*Primary Examiner* — Anh Tai Tran
(74) *Attorney, Agent, or Firm* — Vista IP Law Group, LLP

(57) ABSTRACT

Systems for computer graphics rendering using a web browser to access a cloud-based storage system. Processing commences upon receipt by the cloud-based storage system, of an image file. The image file is sized, and then enumerated into a series of images to be made available for shared access, and viewed in accordance with user commands. The received image is used to generate a plurality of image tiles, wherein the image tiles correspond to particular portions of the image, and wherein the image tiles are associated with respective tile positions. The plurality of image tiles are organized into a multi-level hierarchical file storage structure. The multi-level hierarchical file storage structure comprises two or more hierarchically-related levels to contain image tile files at respective two or more zoom levels. The multi-level hierarchical filepaths and names of the files follow a naming convention pertaining to the respective zoom levels and tile positions.

20 Claims, 11 Drawing Sheets

RENDERING HIGH RESOLUTION IMAGES USING IMAGE TILING AND HIERARCHICAL IMAGE TILE STORAGE STRUCTURES

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

This disclosure relates to the field of computer graphics rendering using a web browser, and more particularly to techniques for rendering high resolution images using image tiling and hierarchical image tile storage structures.

BACKGROUND

The proliferation of cloud based services and platforms continues to increase. Specifically, cloud-based content management services and platforms have impacted the way personal and corporate information are stored, and has also impacted the way personal and corporate information are shared and managed. One benefit of using a cloud based service (e.g., content storage service) is access to content from anywhere and from any device through a web browser. However, web browser applications and common user device displays can be limited in their ability to display high resolution images. For example, a digital representation of a clinical pathology slide can have a native image size of 40,000 pixels by 40,000 pixels, corresponding to an image file requiring over one gigabyte (GB) of storage. Such images and associated image files consume significant computing and communication resources when transferred (e.g., from a cloud based storage service to the browser), and are often too large to be rendered as a single image by the browser. These limitations are exacerbated as users (e.g., researchers) of such images desire to quickly navigate (e.g., pan, zoom, etc.) the images.

One legacy approach for displaying subject high resolution images (e.g., medical images) involves storing the high resolution images using dedicated proprietary storage databases. Such an approach, however, requires costly on-premises hardware infrastructure and supporting software (e.g., for viewing the subject image). Moreover, such dedicated proprietary systems do not include the aforementioned accessibility and collaboration features of a cloud based service. Other legacy approaches pre-render a set of "zoom" images and store the pre-rendered zoom images into a single folder or directory so as to allow retrieval of a subset of the entire image. However, as the size of the subject image to be traversed (e.g., through many zoom levels) increases, so does the number of pre-rendered higher resolution images that are stored in the single folder. Storage of a large number of pre-rendered higher resolution images into the single folder introduces performance bottlenecks that only become worse as the subject images become larger and/or of a higher resolution. Approaches that store many pre-rendered higher resolution images (e.g., many thousands of pre-rendered higher resolution images), in a base folder or directory results in slow file access and retrieval, particularly as users navigate through portions of a subject image.

The problem to be solved is therefore rooted in technological limitations of the legacy approaches. Improved techniques, in particular improved application of technology, are needed to address the problems that arise in a cloud-based storage system when high-density images need to be presented for fast panning and zooming. More specifically, the technologies applied in the aforementioned legacy approaches fail to achieve sought-after capabilities of the herein disclosed techniques for rendering, zooming and panning through high resolution images in a browser. What is needed is a technique or techniques to improve the application and efficacy of various technologies as compared with the application and efficacy of legacy approaches.

SUMMARY

The present disclosure provides improved systems, methods, and computer program products suited to address the aforementioned issues with legacy approaches. More specifically, the present disclosure provides a detailed description of techniques used in systems, methods, and in computer program products for rendering high resolution images using image tiling and hierarchical image tile storage structures. Certain embodiments are directed to technological solutions for partitioning high resolution images into image tiles and mapping the tile position and resolution level of the image tiles to the filenames and directories of the associated image tile files for fast storage and retrieval, which embodiments advance the relevant technical fields, as well as advancing peripheral technical fields. The disclosed embodiments modify and improve over legacy approaches. In particular, practice of the disclosed techniques reduces use of computer memory, reduces demand for computer processing power, and reduces communication overhead needed for quickly storing and retrieving the large number of image tiles used for high resolution image panning and zooming. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of high-performance computer graphics as well as advances in the technical fields of distributed storage.

Some embodiments commence upon receipt by a cloud-based storage system, of at least one image file. The image file is then associated with a series of images to be accessed by two or more user devices at multiple zoom levels. The system uses the received image to generate a plurality of image tile files associated with one or more image tiles, wherein particular ones of the one or more image tiles correspond to particular portions of the image, and wherein the particular ones of the plurality of image tile files are associated with respective tile positions. The plurality of image tile files are organized into a multi-level hierarchical file storage structure. The multi-level hierarchical file storage structure comprises two or more hierarchically-related levels to contain image tile files at respective two or more zoom levels. The multi-level hierarchical filepaths and names of the files follow a naming convention pertaining to the respective zoom levels and tile positions.

Further details of aspects, objectives, and advantages of the disclosure are described below and in the detailed description, drawings, and claims. Both the foregoing general description of the background and the following detailed description are exemplary and explanatory, and are not intended to be limiting as to the scope of the claims.

BRIEF DESCRIPTION OF THE DRAWINGS

The drawings described below are for illustration purposes only. The drawings are not intended to limit the scope of the present disclosure.

DETAILED DESCRIPTION

Figure 1A:
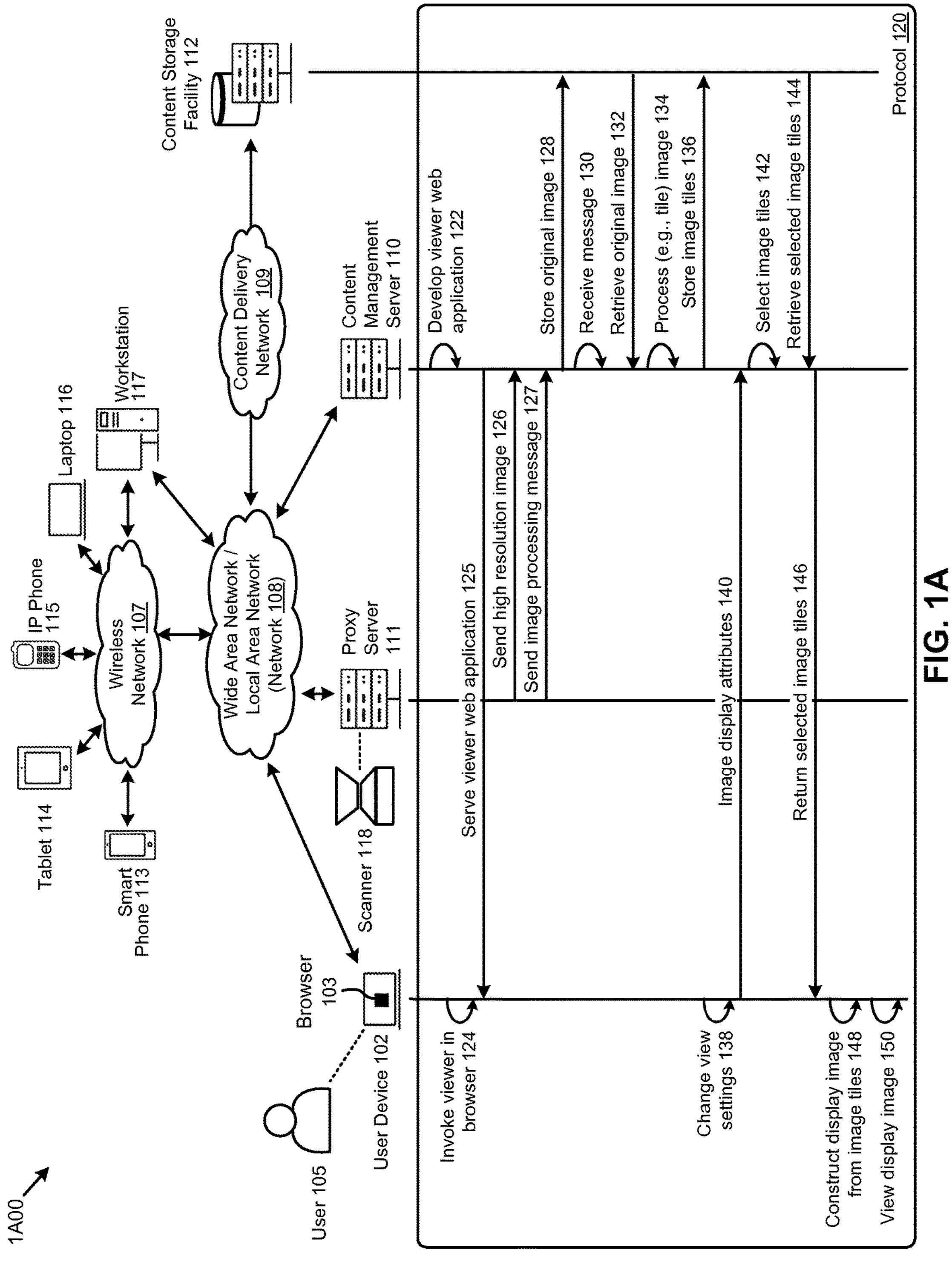
FIG. 1A depicts an environment in which embodiments of the present disclosure can operate.

Some embodiments of the present disclosure address the problem of quickly storing and retrieving the large number of image tiles used for high resolution image panning and zooming. Some embodiments are directed to approaches for partitioning high resolution images into image tiles and mapping the tile position and resolution level of the image tiles to the filenames and directories of the associated image tile files for fast storage and retrieval. More particularly, disclosed herein and in the accompanying figures are exemplary environments, systems, methods, and computer program products for rendering high resolution images using image tiling and hierarchical image tile storage structures.

Overview

The proliferation of cloud based services and platforms continues to increase. Specifically, cloud-based content management services and platforms have impacted the way personal and corporate information are stored, and has also impacted the way personal and corporate information are shared and managed. One benefit of using a cloud based service (e.g., content storage service) is access to content from anywhere and any device through a web browser. However, web browser applications and common user device displays can be limited in their ability to retrieve and display high resolution images.

Hereunder are pre-rendering and analysis approaches as well as naming techniques that facilitate storage of a large number of pre-rendered higher resolution images a multi-level hierarchical file storage structure. Such a multi-level hierarchical file storage structure comprises any number of hierarchically-related levels. Each level contains a small set of image tile files that are pre-rendered at respective zoom levels.

An environment involving browser (e.g., on a user device) and a content management system (e.g., a cloud service) addresses the need for quick retrieval of a specific set of image tiles used for navigating through portions of a high resolution image by panning and zooming. The techniques described herein discuss (1) receiving a high-resolution subject image to be viewed at multiple zoom levels; (2) generating image tiles that can be arranged to represent a portion of the subject image for a given zoom level; and (3) organizing the generated image tiles into a multi-level hierarchical file storage structure having multiple hierarchical levels based on respective multiple zoom levels, and filenames based on image tile positions.

Various embodiments are described herein with reference to the figures. It should be noted that the figures are not necessarily drawn to scale and that the elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment. An aspect or an advantage described in conjunction with a particular embodiment is not necessarily limited to that embodiment and can be practiced in any other embodiments even if not so illustrated. Also, reference throughout this specification to "some embodiments" or "other embodiments" refers to a particular feature, structure, material, or characteristic described in connection with the embodiments as being included in at least one embodiment. Thus, the appearances of the phrase "in some embodiments" or "in other embodiments" in various places throughout this specification are not necessarily referring to the same embodiment or embodiments.

The appended figures discuss aspects in a succession as follows: (1) an environment in which embodiments of the present disclosure can operate; (2) a system for rendering high resolution images using image tiling and hierarchical image tile storage structures; (3) an image tiling technique; (4) an image tile naming and storage technique; and (5) a window-based image tile selection technique. The figures present several exemplary systems and architectures of components suitable for implementing embodiments of the present disclosure, and/or for use in the herein-described environments.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term “or” is intended to mean an inclusive “or” rather than an exclusive “or”. That is, unless specified otherwise, or is clear from the context, “X employs A or B” is intended to mean any of the natural inclusive permutations. That is, if X employs A, X employs B, or X employs both A and B, then “X employs A or B” is satisfied under any of the foregoing instances. The articles “a” and “an” as used in this application and the appended claims should generally be construed to mean “one or more” unless specified otherwise or is clear from the context to be directed to a singular form.

Reference is now made in detail to certain embodiments. The disclosed embodiments are not intended to be limiting of the claims.

Descriptions of Exemplary Embodiments

FIG. 1A depicts an environment 1A00 in which embodiments of the present disclosure can operate. As an option, one or more instances of environment 1A00 or any aspect thereof may be implemented in the context of the architecture and functionality of the embodiments described herein. Also, the environment 1A00 or any aspect thereof may be implemented in any desired environment.

As shown in FIG. 1A, environment 1A00 comprises various computing systems (e.g., servers and devices) interconnected by a wireless network 107, a network 108, and a content delivery network 109. The wireless network 107, the network 108, and the content delivery network 109 can comprise any combination of a wide area network (e.g., WAN), local area network (e.g., LAN), cellular network, wireless LAN (e.g., WLAN), or any such means for enabling communication of computing systems. The wireless network 107, the network 108, and the content delivery network 109 can also collectively be referred to as the Internet. The content delivery network 109 can use any combination of a public network and a private network. More specifically, environment 1A00 comprises at least one instance of a content management server 110, at least one instance of a proxy server 111, and at least one instance of a content storage facility 112. The servers and storage facilities shown in environment 1A00 can represent any single computing system with dedicated hardware and software, multiple computing systems clustered together (e.g., a server farm), a portion of shared resources on one or more computing systems (e.g., virtual server), or any combination thereof. For example, the content management server 110 and the content storage facility 112 can comprise a cloud-based content management platform that provides content management services. Environment 1A00 further comprises an instance of a user device 102 that can represent one of a variety of other computing devices (e.g., a smart phone 113, a tablet 114, an IP phone 115, a laptop 116, a workstation 117, etc.) having software (e.g., a browser 103, an application, etc.) and hardware (e.g., a graphics processing unit, display, monitor, etc.) capable of processing and displaying information (e.g., web page, graphical user interface, etc.) on a display and communicating information (e.g., web page request, user activity, electronic files, etc.) over the wireless network 107, the network 108, and the content delivery network 109. As shown, the user device 102 can be operated by an instance of a user 105. Further, a scanner 118 (e.g., pathology slide scanner, blueprint scanner, high resolution photograph scanner, etc.) can be coupled to the proxy server 111, and capture high resolution images that are sent to the proxy server 111 for various operations.

As shown, the user device 102, the proxy server 111, the content management server 110, and the content storage facility 112 can exhibit a set of high-level interactions (e.g., operations, messages, etc.) in a protocol 120. Specifically, the protocol 120 can represent interactions in systems for rendering high resolution images using image tiling and hierarchical image tile storage structures. As shown, a viewer web application for a browser (e.g., browser 103) can be developed (see operation 122) and delivered (e.g., served by a web server) from the content management server 110 to the user device 102 (see message 125) in response to the user 105 invoking the viewer in the browser 103 (see operation 124). For example, the viewer web application can comprise software instructions (e.g., HTML code, Javascript, PHP code, scripts, etc.) for performing various operations (e.g., image rendering, user event capturing, network communications, etc.). High resolution images (e.g., 40,000 pixel by 40,000 pixel pathology slide) captured on the scanner 118 can be securely sent by the proxy server 111 to the content management server 110 (see message 126). The proxy server 111 can also send image information (e.g., size, filename, etc.) and processing instructions in a message (e.g., HTTP call) to the content management server 110 (see message 127). The content management server 110 can store the original image in the content storage facility 112 (see message 128) and poll for any related image processing messages (see operation 130). When an image processing message is received, the content management server 110 can retrieve the original image associated with the processing message from the content storage facility 112 (see message 132) and perform any processing specified in the image process message (see operation 134). For example, the content management server 110 can generate image tiles from the original image and store the image tiles in a hierarchical file storage structure according to the herein disclosed techniques (see message 136). The processing specified in an image process message can comprise requests and specifications as pertaining to storage and usage (e.g., into one or more formats or representations), and/or for collaboration (e.g., publishing any pre-processed images for shared read access, and/or shared write/modify access, etc.).

When the user 105 changes the view settings from the viewer web application (see operation 138), certain image display attributes (e.g., x-coordinate, y-coordinate, zoom setting, zoom level, resolution level, etc.) can be sent to the content management server 110 (see message 140) and used to select the image tiles for rendering the desired view (see operation 142). For example, the user 105 might roll a mouse roller one click to zoom to a next zoom level, and/or the user 105 might move a mouse cursor to a new x-coordinate and y-coordinate on the displayed image. The content management server 110 can then retrieve the selected image tiles from the content storage facility 112 (see message 144) and return the selected image tiles to the user device 102 (see message 146). The viewer web application can then arrange the selected image tiles to construct the new display image (see operation 148) for viewing by the user 105 on user device 102 (see operation 150). One embodiment of a system for implementing the techniques shown in protocol 120 for rendering high resolution images using image tiling and hierarchical image tile storage structures is shown in FIG. 1B.

Figure 1B:
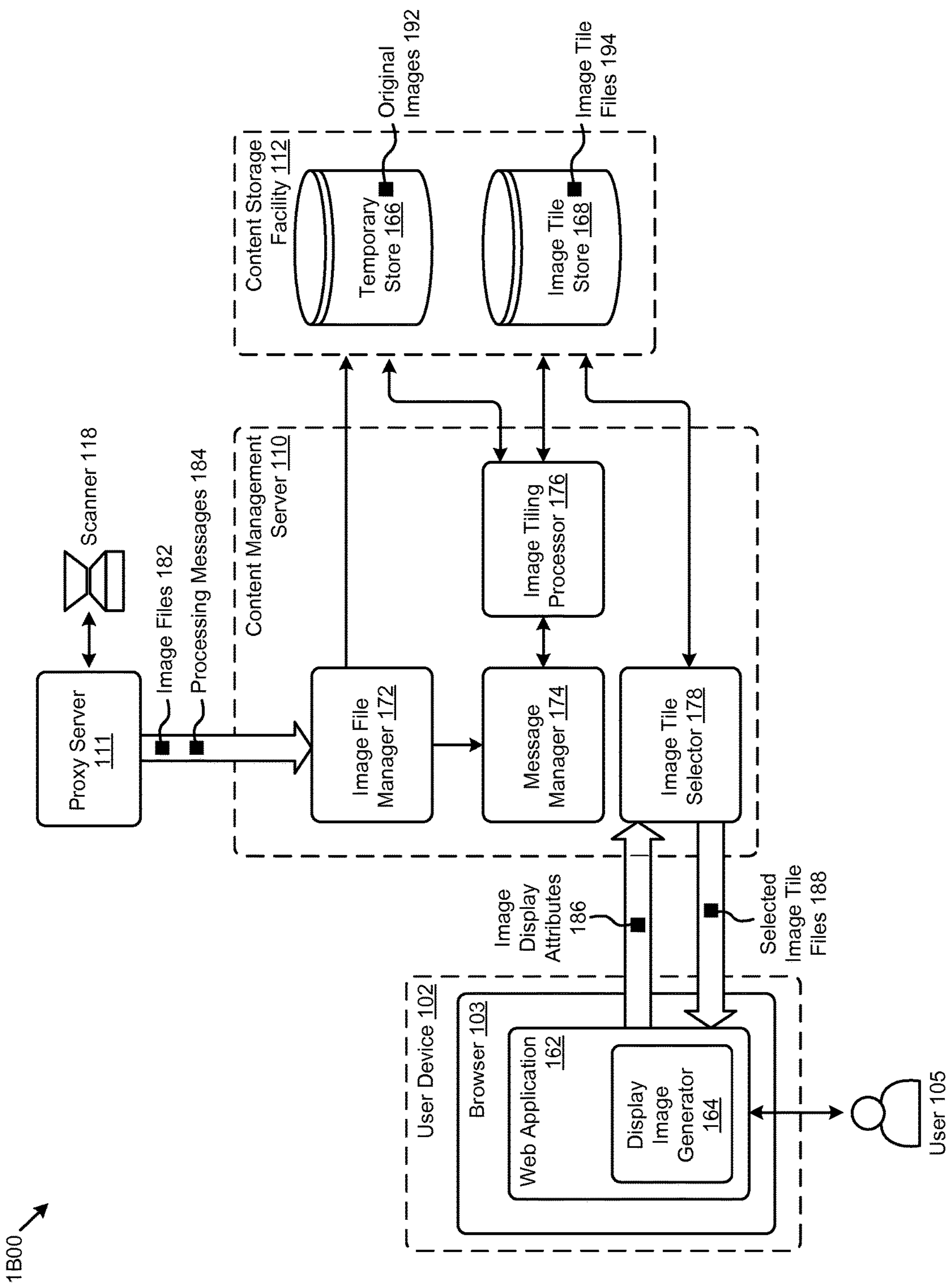
FIG. 1B shows a system for rendering high resolution images using image tiling and hierarchical image tile storage structures, according to an embodiment.

FIG. 1B shows a system 1B00 for rendering high resolution images using image tiling and hierarchical image tile storage structures. As an option, one or more instances of system 1B00 or any aspect thereof may be implemented in the context of the architecture and functionality of the embodiments described herein. Also, the system 1B00 or any aspect thereof may be implemented in any desired environment.

The system 1B00 shown in FIG. 1B presents an example embodiment of various modules for implementing the herein disclosed techniques, and operated by the user device 102 and the content management server 110 from environment 1A00. The content storage facility 112, the proxy server 111, and the scanner 118 from environment 1A00 are also shown for reference. Specifically, the user device 102 can operate a web application 162 comprising a display image generator 164, and the content management server 110 can operate an image file manager 172, a message manager 174, an image tile processor 176, and an image tile selector 178. As shown, the image file manager 172 can receive image files 182 and processing messages 184 from the proxy server 111 or another computing device. The image file manager 172 can store the original images 192 in a temporary store 166 in the content storage facility 112, and also forward the processing messages 184 to the message manager 174. In one or more embodiments, the message manager 174 can continually poll for new messages and take action when a new message is received. For example, a received message may specify that a certain instance included in the original images 192 be retrieved for processing by the image tiling processor 176. More specifically, the image tiling processor 176 can process a specified image to generate one or more image tiles and store the associated image tile files 194 in an image tile store 168 in the content storage facility 112. Further, in one or more embodiments of the herein disclosed techniques, the image tiling processor 176 can map the tile position and resolution level of the generated image tiles to the filenames and directories of the associated image tile files for fast storage and retrieval.

For example, as shown, when a new view setting specified by the user 105 is received by the web application 162, certain instances of image display attributes 186 (e.g., x-coordinate, y-coordinate, zoom setting, zoom level, resolution level, etc.) can be sent to the image tile selector 178. The image tile selector 178 can use the image display attributes 186 to determine the selected image tile files 188 from the image tile files 194 required to render the view desired by the user 105. The display image generator 164 in the web application 162 can then arrange the selected image tiles to construct the new display image for viewing by the user 105 on user device 102. Further details of an image tiling technique that can be implemented in the system 1B00 is described as pertains to FIG. 2A.

Figure 2A:
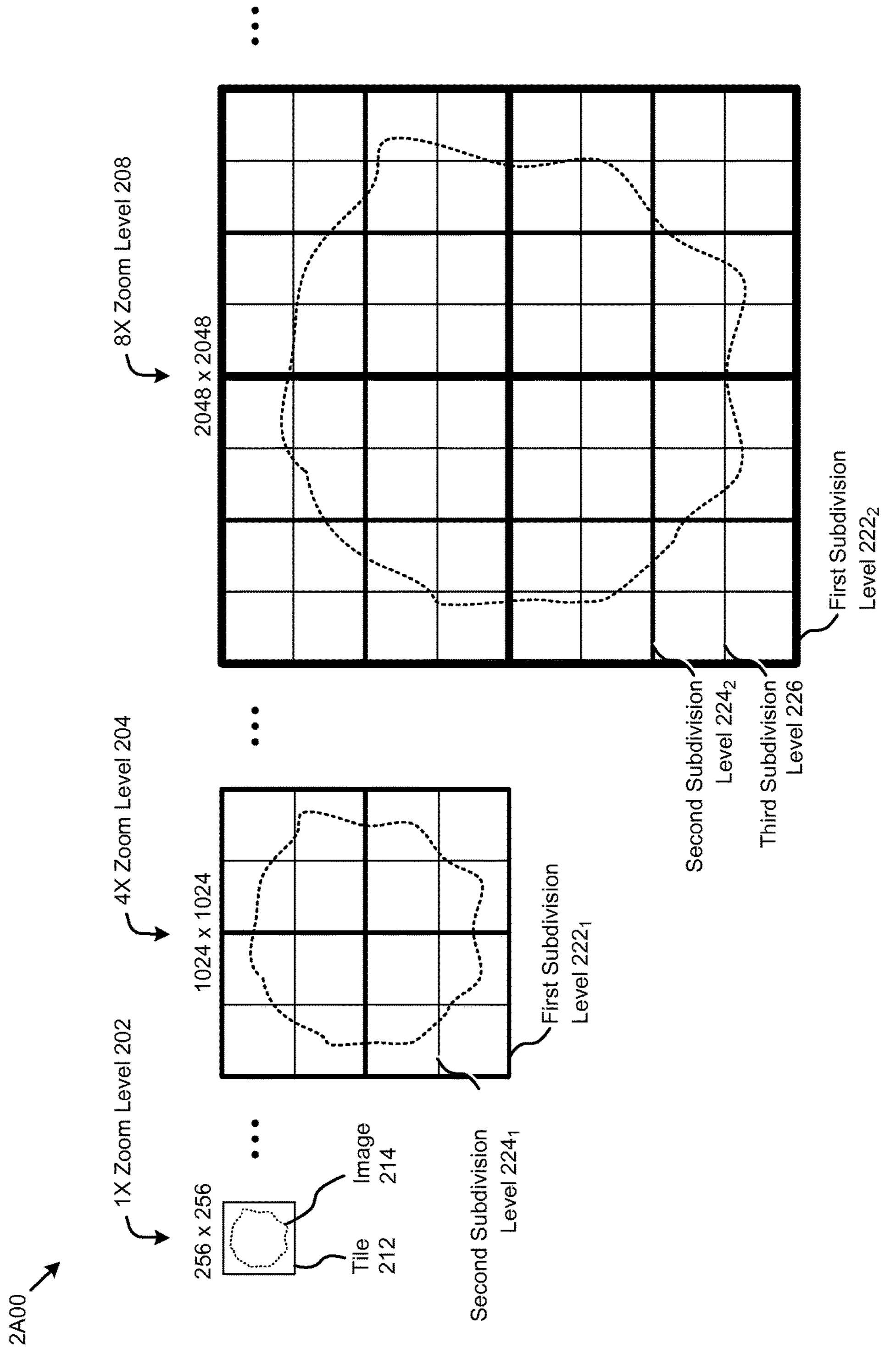
FIG. 2A is an image tiling technique as used in systems for rendering high resolution images using image tiling and hierarchical image tile storage structures, according to some embodiments.

FIG. 2A is an image tiling technique 2A00 as used in systems for rendering high resolution images using image tiling and hierarchical image tile storage structures, according to some embodiments. As an option, one or more instances of image tiling technique 2A00 or any aspect thereof may be implemented in the context of the architecture and functionality of the embodiments described herein. Also, the image tiling technique 2A00 or any aspect thereof may be implemented in any desired environment.

The image tiling technique 2A00 shown in FIG. 2A presents representative zoom levels (e.g., 1×zoom level 202, 4× zoom level 204, and 8× zoom level 208) and associated resolution levels (e.g., 256×256, 1024×1024, and 2048×2048, respectively) and image tile arrangements associated with tiling an image 214. Other zoom levels, resolution levels, and image tile arrangements are possible. In the example shown in FIG. 2A, a quadtree tiling approach is implemented, such that the image space (e.g., two-dimensional area) is recursively subdivided into four quadrants or regions. The regions may be square or rectangular, or may have arbitrary shapes. In the image tiling technique 2A00 shown in FIG. 2A, a minimum quadrant or region is represented by a tile 212 that is square with a tile resolution of (T×T) pixels, (e.g., 256×256 pixels). Further, the number of subdivision levels S is related to the zoom level Z and the resolution level (R×R) as follows:

$$Z=2^{s} \qquad \text{(EQ. 1)}$$

$$(R\times R)=Z\cdot(T\times T) \qquad \text{(EQ. 2)}$$

FIG. 2A illustrates the subdivision levels (e.g., first subdivision level $\mathbf{222}_1$ and second subdivision level $\mathbf{224}_1$) for 4× zoom level 204, and the subdivision levels (e.g., first subdivision level $\mathbf{222}_2$, second subdivision level $\mathbf{224}_2$, and third subdivision level 226) for 8× zoom level 208, using progressively thinner line widths to indicate the quadrant boundaries. Also, as shown in EQ. 1, implementing the quadtree approach results in zoom levels that are related by factors of two. Other tiling organizations are possible. For example, rather than a quadtree that roughly approximates a two square on edge viewing area and aspect ratio (e.g., assuming a square pixel), other aspect ratios are possible. For example, rather than a quadtree approximation of a square aspect ratio, a 16 by 9 (e.g., 16:9) aspect ratio can be pursued, and each resolution level can comprise 16 time 9 =144 image tiles.

Further, according to EQ. 2, one or more resolution levels associated with a respective zoom level can comprise a resolution range. As an example, given a native image size for image 214 of 40,000 by 40,000 pixels, and a tile resolution for tile 212 of 256 by 256 pixels, the aforementioned parameters associated with the image tiling technique 2A00 are shown in Table 1:

TABLE 1

Example Tiling Parameters

| Parameter | Value(s) |
|---|---|
| Native Image Size | 40,000 × 40,000 pixels |
| Tile Size | 256 × 256 pixels |
| Subdivision Levels | 0, 1, 2, 3, 4, 5, 6, 7, 8 |
| Zoom Levels | 1, 2, 4, 8, 16, 32, 64, 128, 256 |
| Resolution Range | 256 × 256 to 40,000 × 40,000 (limited by native image size) |

In the example shown in Table 1, over 100,000 image tiles and associated image tile files might be generated. Such image tile files need a method for identifying and referencing the files for storage and retrieval when constructing representative views of the original image. One approach is illustrated in FIG. 2B.

Figure 2B:
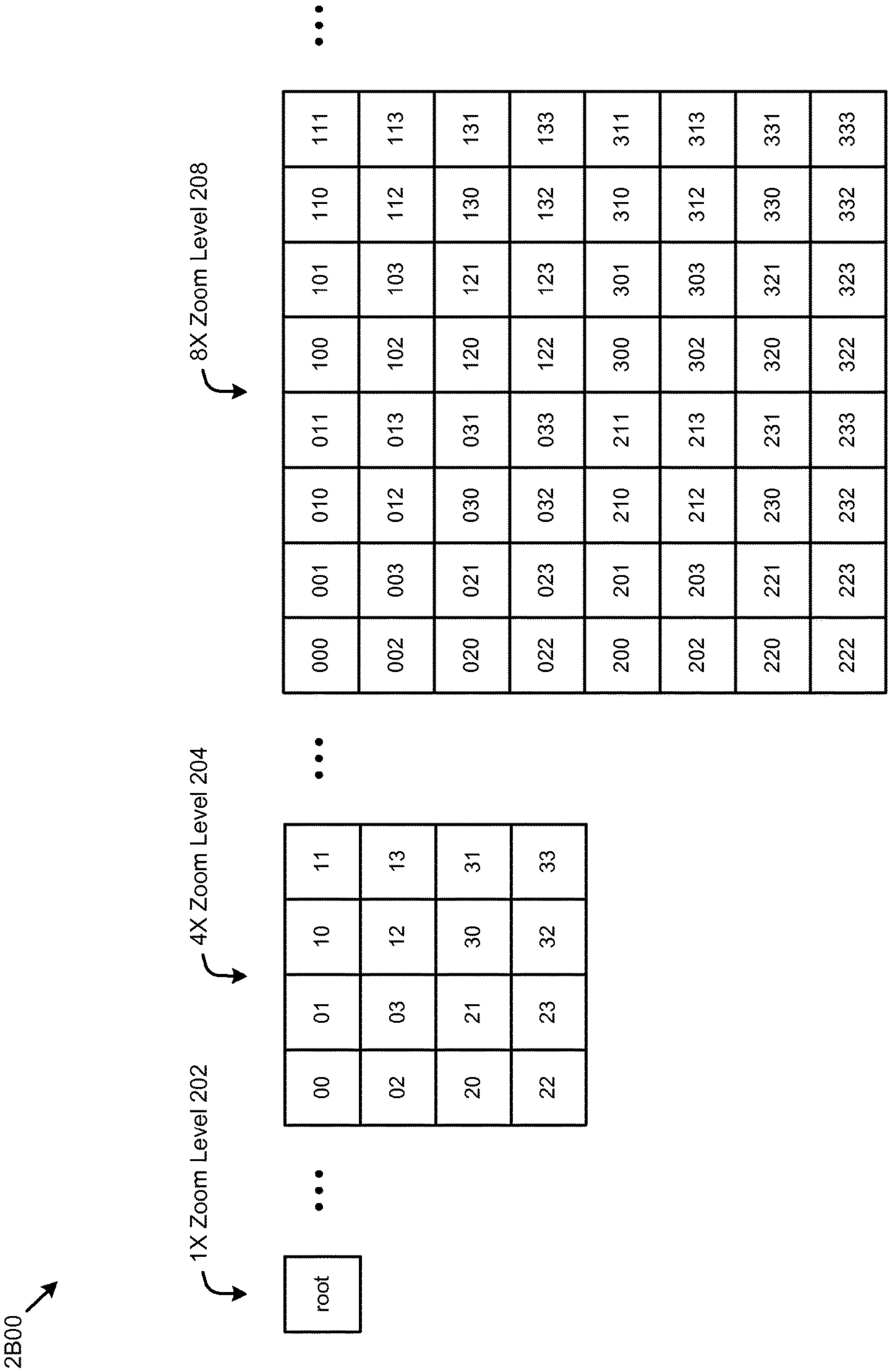
FIG. 2B illustrates an image tile identification approach.

FIG. 2B illustrates an image tile identification approach 2B00. As shown, the tiles for each zoom level (e.g., 1× zoom level 200, 4× zoom level 204, and 8× zoom level 208) are identified by a unique alphanumeric identifier associated with the quadrant location and subdivision level of the respective tile. For example, the image tile identified by "213" in the 8× zoom level 208, is in quadrant "2" of the first subdivision level, quadrant "1" of the second subdivision level, and quadrant "3" of the third subdivision level. One legacy approach for storing image tiles is to store them in image tile files having filenames corresponding to the identifiers shown in FIG. 2B. For example, image tile "213 " can be stored in an image tile file named "213 .png". Approaches that store multiple thousands of image tile files in a single folder or directory results in slow file access and retrieval. The herein disclosed techniques address the aforementioned slow file access and retrieval problem, in particular, the approach given in the following figures present hierarchical image tile storage structures and hierarchical image tile storage and retrieval techniques.

Figure 3A:
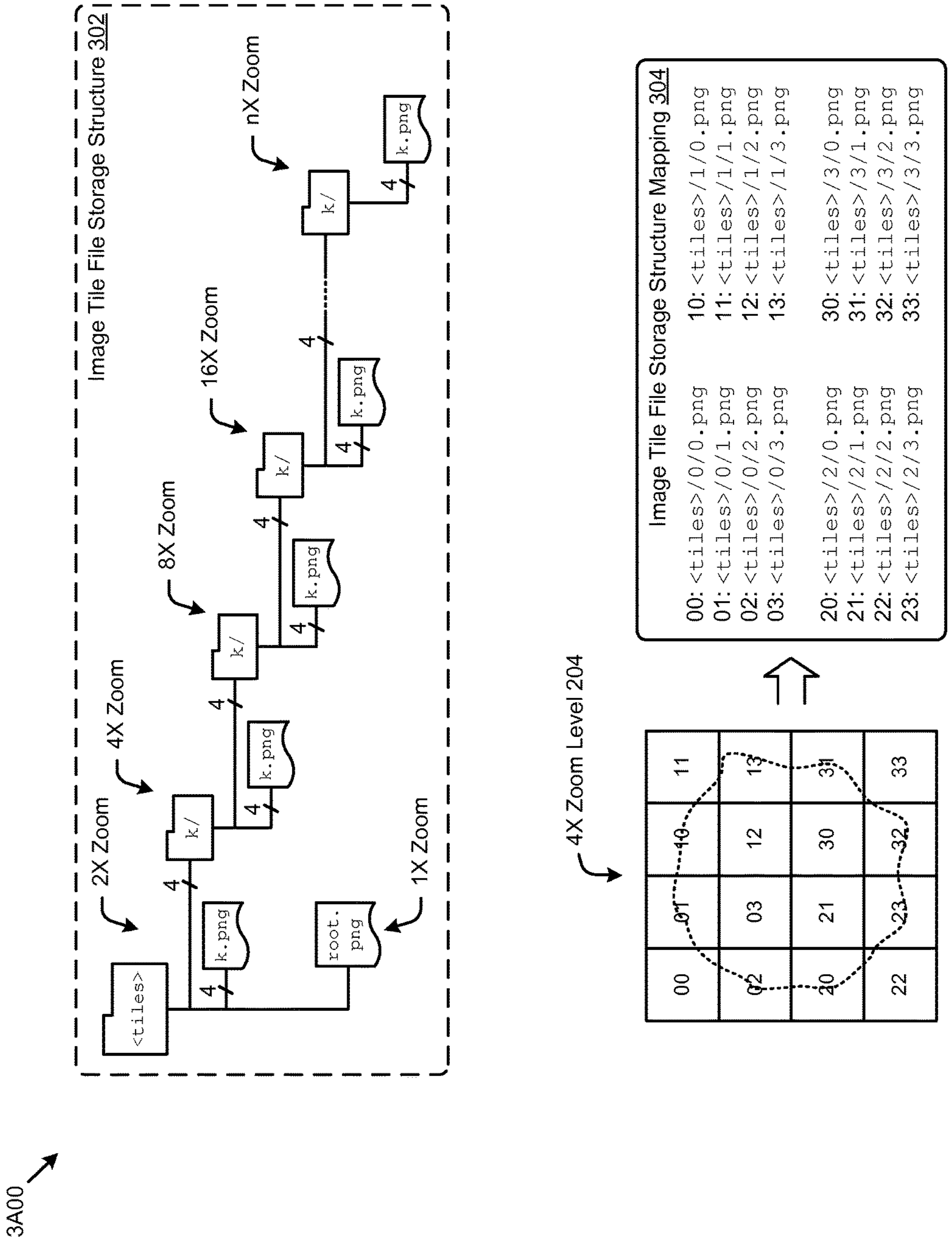
FIG. 3A presents an image tile storage technique used in systems for rendering high resolution images using image tiling and hierarchical image tile storage structures, according to some embodiments.

FIG. 3A presents an image tile storage technique 3A00 used in systems for rendering high resolution images using image tiling and hierarchical image tile storage structures, according to some embodiments. As an option, one or more instances of image tile storage technique 3A00 or any aspect thereof may be implemented in the context of the architecture and functionality of the embodiments described herein. Also, the image tile storage technique 3A00 or any aspect thereof may be implemented in any desired environment.

The image tile storage technique 3A00 shown in FIG. 3A presents an image tile file storage structure 302 and an image tile file storage structure mapping 304 according to some embodiments of the herein disclosed techniques. Specifically, the image tile file storage structure 302 gives a view of hierarchically related directories and associated files, corresponding to zoom levels (e.g., 1× zoom, 2× zoom, . . . , n× zoom). The levels traverse from a root directory labeled "<tiles>". The "<tiles>" directory can include a single tile file (e.g., "root. png") corresponding to the 1×0 zoom level, and the four tile files (e.g., "k.png", where k=0, 1, 2, 3) corresponding to the 2× zoom level. The "<tiles>" directory can further comprise up to four child directories (e.g., "/k", where k=0, 1, 2, 3) corresponding to a respective quadrant of a first subdivision level. As shown, each of the four child directories further comprises four tile files (e.g., "k.png", where k=0, 1, 2, 3). The aforementioned structure can continue as an image is tiled at further zoom levels. The approach shown in the image tile storage technique 3A00 and described herein, efficiently maps an image tile position and resolution level and/or zoom level to a storage location in the image tile file storage structure 302. The shown organization limits the number of files in each directory to four files, allowing for fast storage and retrieval of a relatively smaller set of needed files when traversing (e.g., zooming) through a relatively larger set of image files.

As an example, the image tile file storage structure mapping 304 illustrates the mapping of image tile positions and resolution level to filenames and directories. Specifically, the image tiles and associated identifiers for the 4× zoom level 204 are mapped to filenames and directories according to the image tile file storage structure 302 previously described. More specifically, for example, the image tile file associated with image tile "23" is mapped to the filename and directory location "<tiles>/2/3. png". As another example, the image tile file associated with image tile "12" is mapped to the filename and directory location "<tiles>/1/2.png".

Figure 3B:
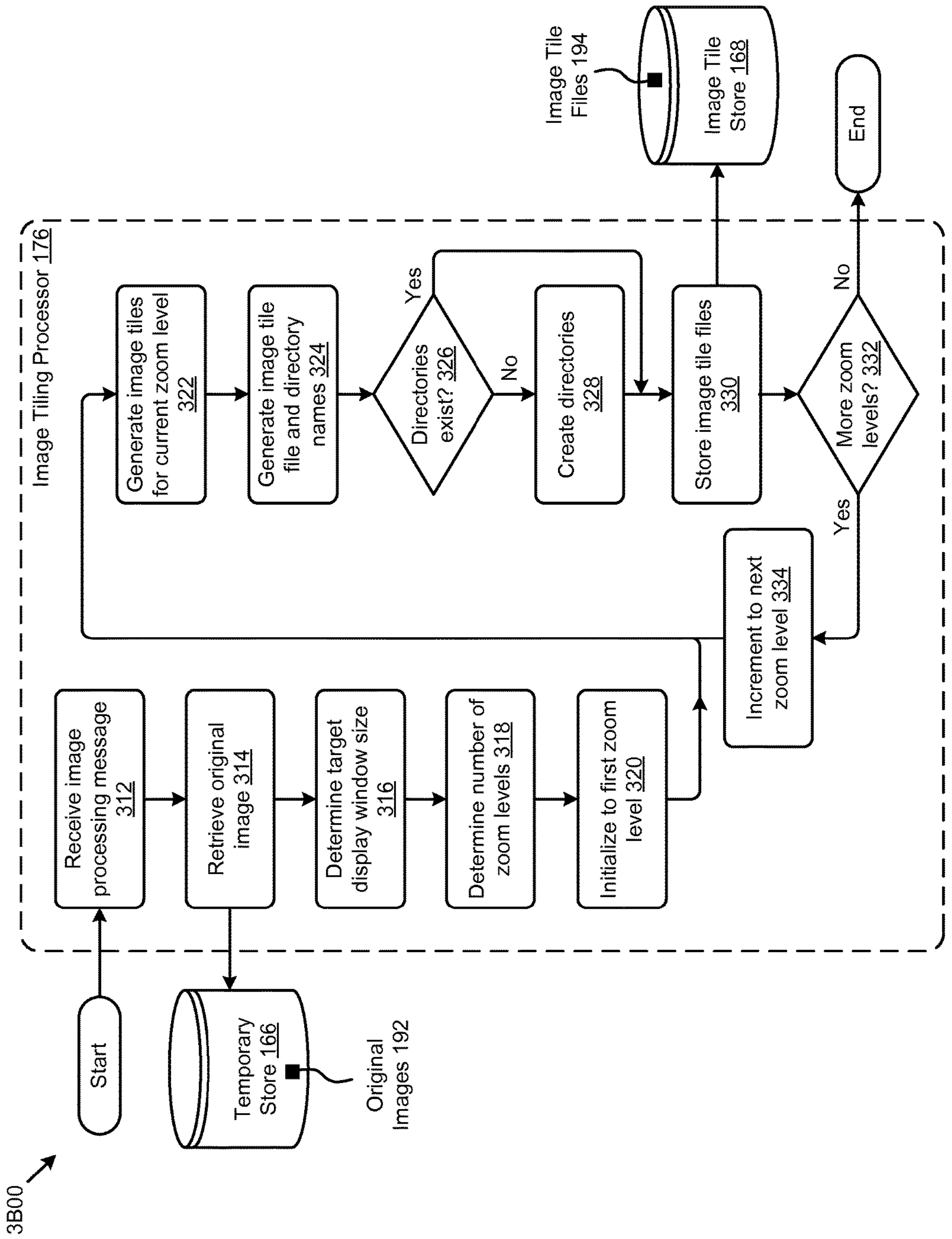
FIG. 3B is a flow diagram of an image tiling and storage approach in systems for rendering high resolution images using image tiling and hierarchical image tile storage structures, according to some embodiments.

FIG. 3B is a flow diagram 3B00 of an image tiling and storage approach in systems for rendering high resolution images using image tiling and hierarchical image tile storage structures, according to some embodiments. As an option, one or more instances of flow diagram 3B00 or any aspect thereof may be implemented in the context of the architecture and functionality of the embodiments described herein. Also, the flow diagram 3B00 or any aspect thereof may be implemented in any desired environment.

The flow diagram 3B00 shown in FIG. 3B comprises certain operations that can be executed by the image tiling processor 176 described in FIG. 1B. For reference, the temporary store 166 and the image tile store 168 from FIG. 1B are also shown. Additional or fewer steps and/or other allocations of operations are possible. Specifically, the flow diagram 3B00 can be used in systems for rendering high resolution images using image tiling and hierarchical image tile storage structures. More specifically, the flow diagram 3B00 can start with the image tiling processor 176 receiving an image processing message (see step 312) and retrieving an original image in response to the image processing message (see step 314). For example, the filename and location of the original image and certain processing instructions can be included in the image processing message. The image tiling processor 176 can then determine a target display window size (see step 316). For example, the target display window size (e.g., 600×900 pixels) can further be included in the image processing message, included in certain configuration settings, or calculated from other known parameters. A number of zoom levels can then be determined (see step 318). For example, the zoom levels can span a resolution range from the resolution corresponding to the native image size of the original image (e.g., n× zoom level), to the resolution corresponding to viewing the complete original image in the target display window size (e.g., 1× zoom level). The flow diagram 3B00 continues by initializing to a first zoom level, such as the 1× zoom level or the n× zoom level (see step 320).

Certain steps can then be executed at the first zoom level and the other identified zoom levels, commencing with generating image tiles for the current zoom level (see step 322) and associated image tile file and directory names (see step 324). For example, the associated filenames and directories can be determined in part by the image tile storage technique 3A00 shown in FIG. 3A, and other techniques disclosed herein. The generated directories are checked for existence (see decision 326) and created if they do not exist (see step 328). When the filenames and directories have been determined and created, the image tiling processor 176 can store the image tiles (see step 330). If there are more zoom levels at which to apply the tiling process (see decision 332), the next zoom level is selected (see step 334) and the tiling process repeats with step 322 until all zoom levels have been processed.

Figure 4A:
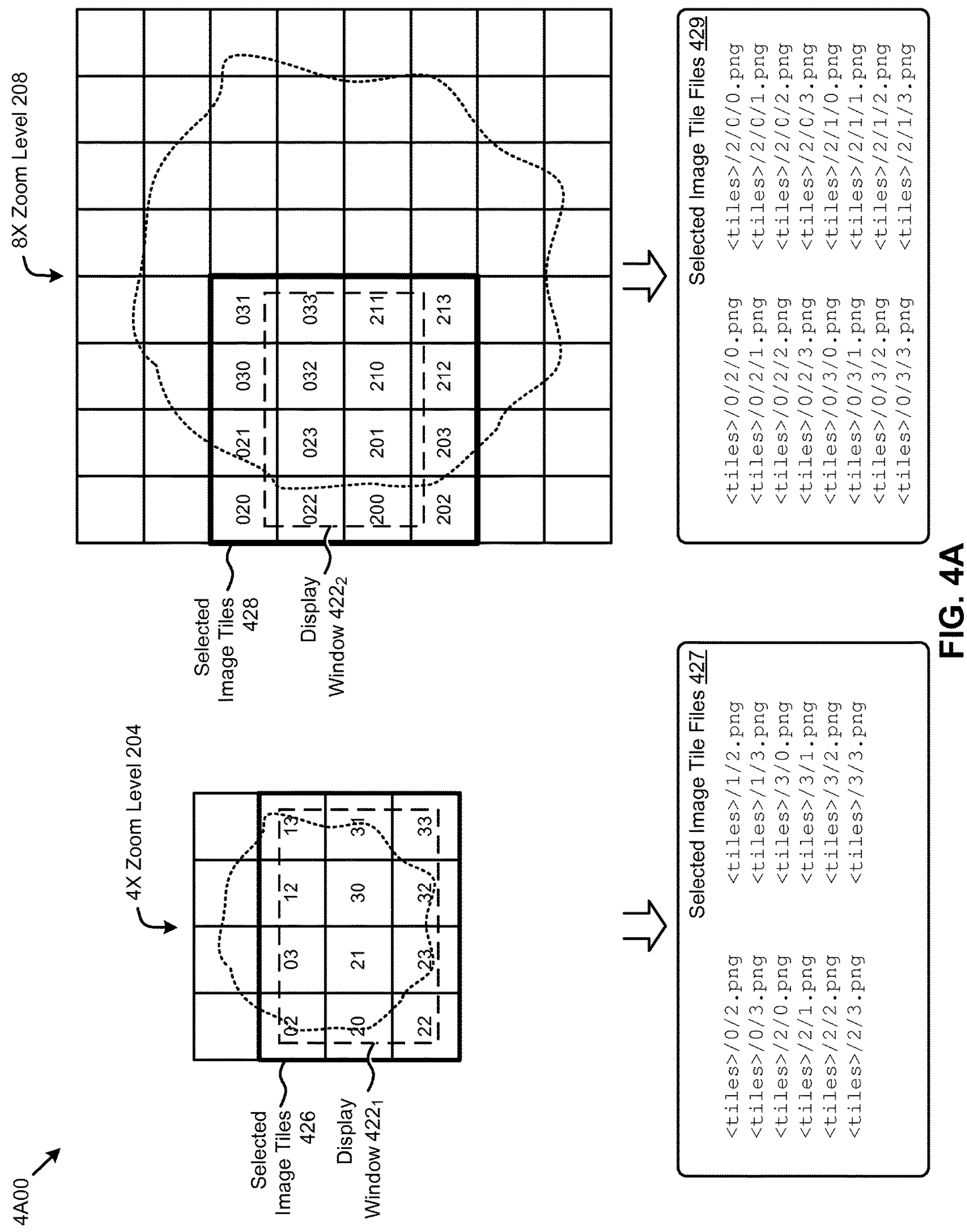
FIG. 4A presents an image tile selection technique as used for viewing images in systems for rendering high resolution images using image tiling and hierarchical image tile storage structures, according to some embodiments.

FIG. 4A presents an image tile selection technique 4A00 as used for viewing images in systems for rendering high resolution images using image tiling and hierarchical image tile storage structures, according to some embodiments. As an option, one or more instances of image tile selection technique 4A00 or any aspect thereof may be implemented in the context of the architecture and functionality of the embodiments described herein. Also, the image tile selection technique 4A00 or any aspect thereof may be implemented in any desired environment.

The image tile selection technique 4A00 shown in FIG. 4A illustrates the image tiles and associated image tile files selected to generate a display image for a given set of image display attributes (e.g., x-coordinate, y-coordinate, zoom level, etc.) specified by a user. Specifically, in one example, a user selects (e.g., by moving a mouse while holding down a mouse button) a certain x-y position of a display window $422_1$ and selects (e.g., by rolling a mouse roller forward one click) the 4× zoom level 204. In this example, the selected image tiles 426 and corresponding selected image tile files 427 will be retrieved and arranged for rendering in the display window $422_1$. In another example shown, the user selects (e.g., by moving the mouse while holding down the mouse button) a certain x-y position of a display window $422_2$ and selects (e.g., by rolling the mouse roller forward one click) the 8× zoom level 208. In this example, the selected image tiles 428 and corresponding selected image tile files 429 will be retrieved and arranged for rendering in the display window $422_2$. In both shown examples and other examples and embodiments, the image tile selection technique 4A00 addresses the problem of fast storage and retrieval of a large number of image tiles used for high resolution image panning and zooming by selecting only the image tiles and image tile files necessary to fill the specified display window and zoom level setting. For example, in the 8× zoom scenario, 16 of the available 64 image tiles were selected to render the requested view. Further, storing the image tile files (e.g., see selected image tile files 427 and selected image tile files 429) using the prior discussed image tile file storage structure 302, enables efficient and fast retrieval of the image tile files for rendering.

Figure 4B:
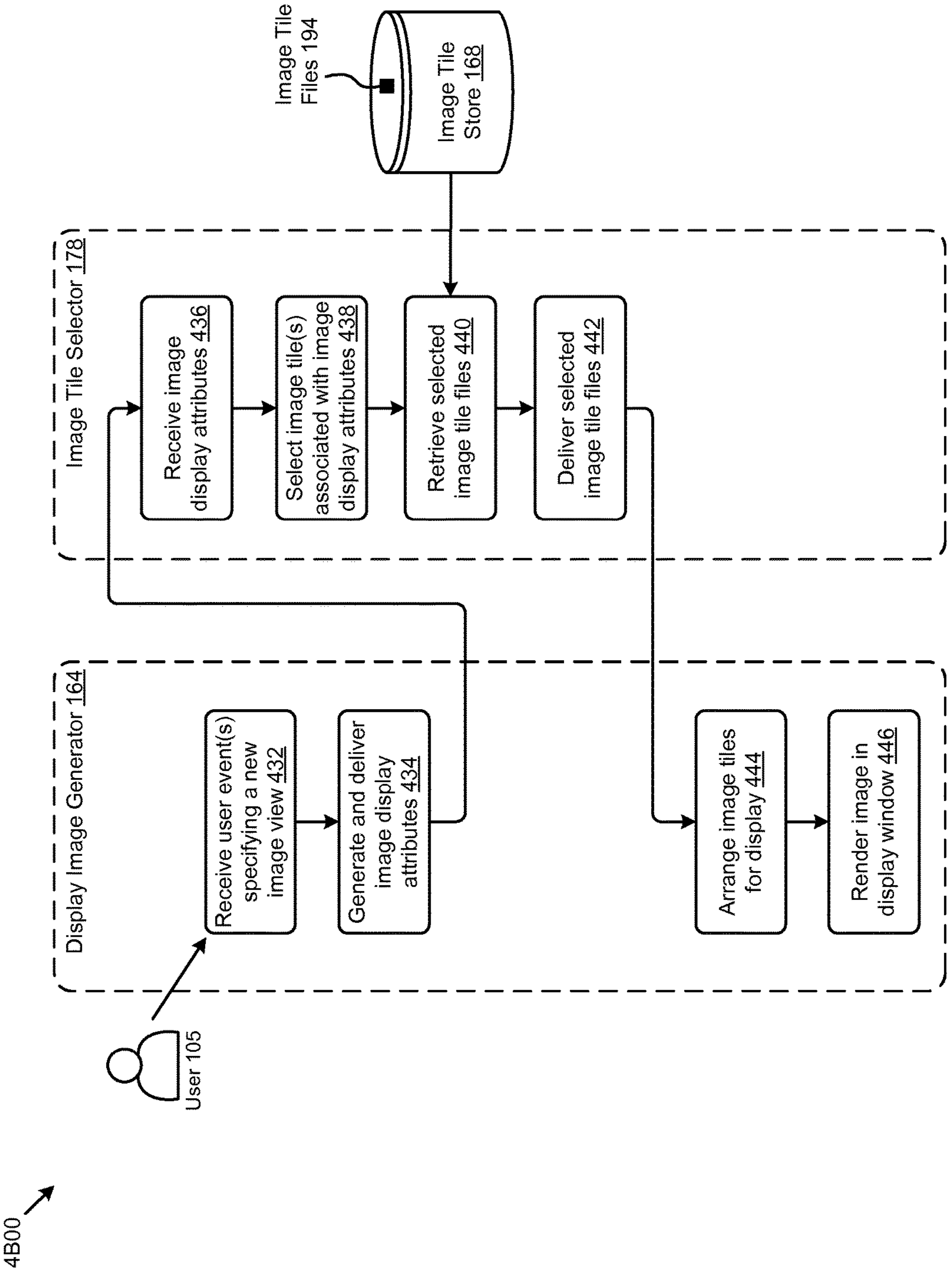
FIG. 4B depicts a flow diagram of an image selection and display approach in systems for rendering high resolution images using image tiling and hierarchical image tile storage structures, according to some embodiments.

FIG. 4B depicts a flow diagram 4B00 of an image selection and display approach in systems for rendering high resolution images using image tiling and hierarchical image tile storage structures, according to some embodiments. As an option, one or more instances of flow diagram 4B00 or any aspect thereof may be implemented in the context of the architecture and functionality of the embodiments described herein. Also, the flow diagram 4B00 or any aspect thereof may be implemented in any desired environment.

The flow diagram 4B00 shown in FIG. 4B comprises certain operations that can be executed by the display image generator 164 and the image tile selector 178 described in FIG. 1B. For reference, the image tile store 168 from FIG. 1B is also shown. Additional or fewer steps and/or other allocations of operations are possible. Specifically, the flow diagram 4B00 can be used in systems for rendering any form or manner of high resolution images using image tiling and hierarchical image tile storage structures. More specifically, the flow diagram 4B00 can start with the display image generator 164 receiving one or more user (e.g., user 105) events (e.g., a mouse button click, a mouser roller click, a DOM event, etc.) specifying a new image view (see step 432). The display image generator 164 can then generate (e.g., calculate, codify, etc.) and deliver the image display attributes associated with the specified new image view to the image tile selector 178 (see step 434). The image tile selector 178 can receive the image display attributes (see step 436) and select the one or more image tiles required to construct the specified new image view described by the image display attributes (see step 438). The image tile selector 178 can then retrieve the selected image tile files (see step 440) and deliver the selected image tile files to the display image generator 164 (see step 442). The display image generator 164 can then arrange the selected image tiles for display (see step 444) and render the new image view in the display window (see step 446). The display attributes (see step 438) can comprise user commands, and a user command can comprise a mouse click or a pan command or a zoom command, or a point of interest command specifying any combination of an x-coordinate, and/or a y-coordinate, and/or a zoom setting.

Additional Embodiments of the Disclosure

Additional Practical Application Examples

Figure 5:
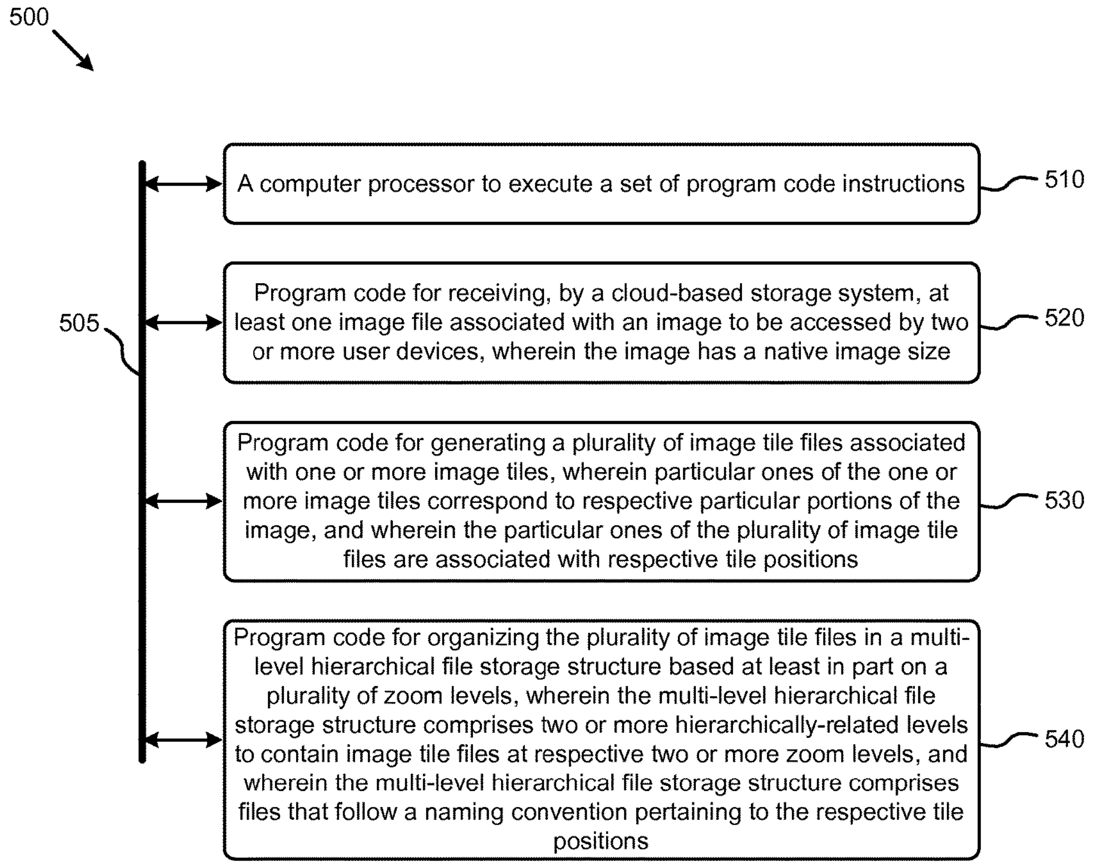
FIG. 5 depicts system components as arrangements of computing modules that are interconnected so as to implement certain of the herein-disclosed embodiments.

FIG. 5 depicts a system 500 as an arrangement of computing modules that are interconnected so as to operate cooperatively to implement certain of the herein-disclosed embodiments. The partitioning of system 500 is merely illustrative and other partitions are possible. As an option, the present system 500 may be implemented in the context of the architecture and functionality of the embodiments described herein. Of course, however, the system 500 or any operation therein may be carried out in any desired environment. The system 500 comprises at least one processor and at least one memory, the memory serving to store program instructions corresponding to the operations of the system. As shown, an operation can be implemented in whole or in part using program instructions accessible by a module. The modules are connected to a communication path 505, and any operation can communicate with other operations over communication path 505. The modules of the system can, individually or in combination, perform method operations within system 500. Any operations performed within system 500 may be performed in any order unless as may be specified in the claims. The shown embodiment implements a portion of a computer system, presented as system 500, comprising a computer processor to execute a set of program code instructions (see module 510) and modules for accessing memory to hold program code instructions to perform: receiving, by a cloud-based storage system, at least one image file associated with an image to be accessed by two or more user devices, wherein the image has a native image size (see module 520); generating a plurality of image tile files associated with one or more image tiles, wherein particular ones of the one or more image tiles correspond to respective particular portions of the image, and; the particular ones of the plurality of image tile files are associated with respective tile positions (see module 530); and organizing the plurality of image tile files in a multi-level hierarchical file storage structure based at least in part on a plurality of zoom levels, wherein the multi-level hierarchical file storage structure comprises two or more hierarchically-related levels to contain image tile files at respective two or more zoom levels, and wherein the multi-level hierarchical file storage structure comprises files that follow a naming convention pertaining to the respective tile positions (see module 540).

System Architecture Overview

Additional System Architecture Examples

Figure 6A:
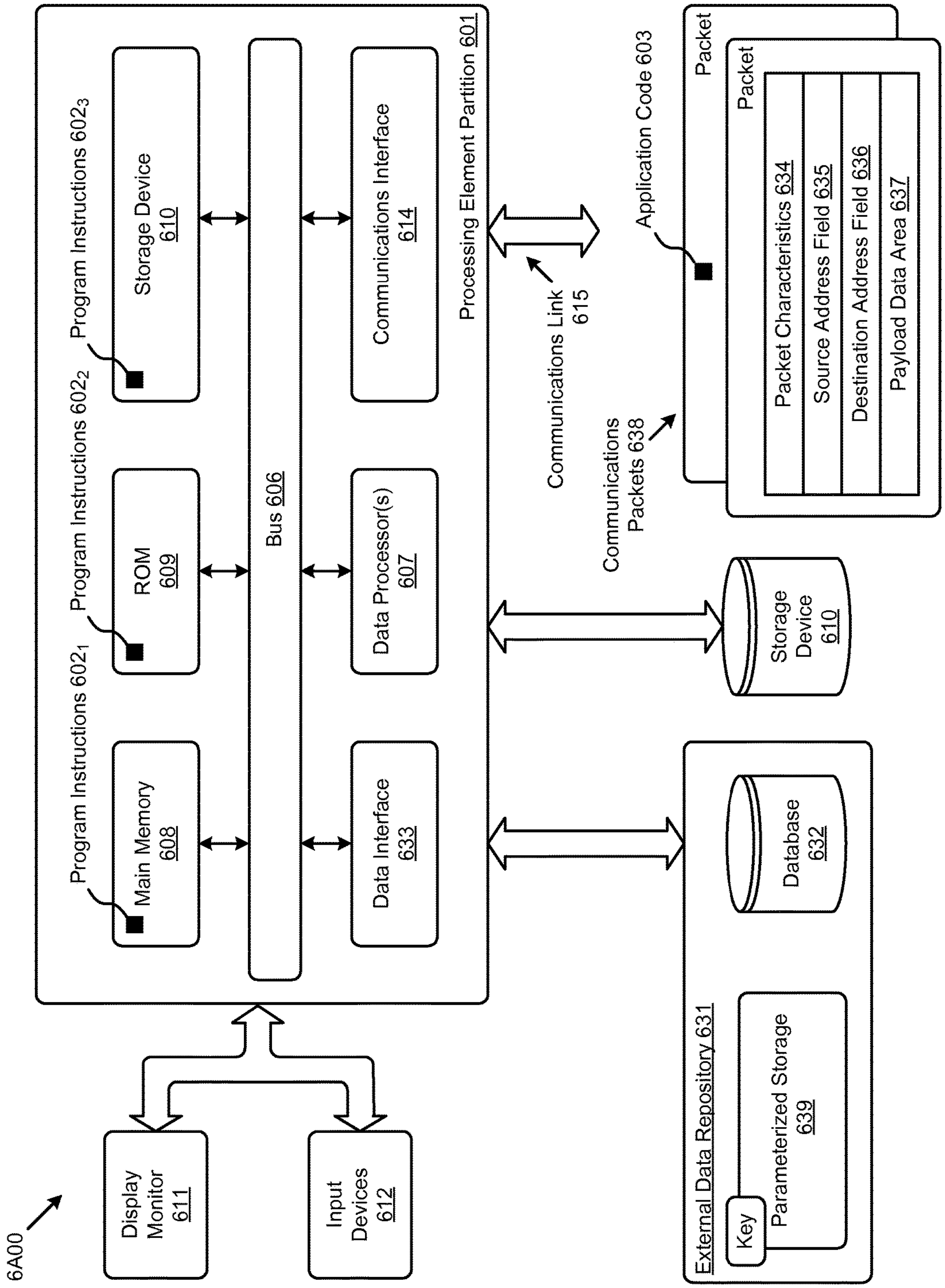
FIG. 6A and FIG. 6B depict exemplary architectures of components suitable for implementing embodiments of the present disclosure, and/or for use in the herein-described environments.

FIG. 6A depicts a block diagram of an instance of a computer system 6A00 suitable for implementing embodiments of the present disclosure. Computer system 6A00 includes a bus 606 or other communication mechanism for communicating information. The bus interconnects subsystems and devices such as a CPU, or a multi-core CPU (e.g., data processor 607), a system memory (e.g., main memory 608, or an area of random access memory RAM), a non-volatile storage device or non-volatile storage area (e.g., ROM 609), an internal or external storage device 610 (e.g., magnetic or optical), a data interface 633, a communications interface 614 (e.g., PHY, MAC, Ethernet interface, modem, etc.). The aforementioned components are shown within processing element partition 601, however other partitions are possible. The shown computer system 6A00 further comprises a display 611 (e.g., CRT or LCD), various input devices 612 (e.g., keyboard, cursor control), and an external data repository 631.

According to an embodiment of the disclosure, computer system 6A00 performs specific operations by data processor 607 executing one or more sequences of one or more program code instructions contained in a memory. Such instructions (e.g., program instructions $602_1$, program instructions $602_2$, program instructions $602_3$, etc.) can be contained in or can be read into a storage location or memory from any computer readable/usable medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination therefrom.

According to an embodiment of the disclosure, computer system 6A00 performs specific networking operations using one or more instances of communications interface 614. Instances of the communications interface 614 may comprise one or more networking ports that are configurable (e.g., pertaining to speed, protocol, physical layer characteristics, media access characteristics, etc.) and any particular instance of the communications interface 614 or port thereto can be configured differently from any other particular instance. Portions of a communication protocol can be carried out in whole or in part by any instance of the communications interface 614, and data (e.g., packets, data structures, bit fields, etc.) can be positioned in storage locations within communications interface 614, or within system memory, and such data can be accessed (e.g., using random access addressing, or using direct memory access DMA, etc.) by devices such as data processor 607.

The communications link 615 can be configured to transmit (e.g., send, receive, signal, etc.) communications packets 638 comprising any organization of data items. The data items can comprise a payload data area 637, a destination address 636 (e.g., a destination IP address), a source address 635 (e.g., a source IP address), and can include various encodings or formatting of bit fields to populate the shown packet characteristics 634. In some cases the packet characteristics include a version identifier, a packet or payload length, a traffic class, a flow label, etc. In some cases the payload data area 637 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 607 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 631, which in turn can be formatted into any one or more storage areas, and which can comprise parameterized storage 639 accessible by a key (e.g., filename, table name, block address, offset address, etc.).

Execution of the sequences of instructions to practice certain embodiments of the disclosure are performed by a single instance of the computer system 6A00. According to certain embodiments of the disclosure, two or more instances of computer system 6A00 coupled by a communications link 615 (e.g., LAN, PTSN, or wireless network) may perform the sequence of instructions required to practice embodiments of the disclosure using two or more instances of components of computer system 6A00.

The computer system 6A00 may transmit and receive messages such as data and/or instructions organized into a data structure (e.g., communications packets 638). The data structure can include program instructions (e.g., application code 603), communicated through communications link 615 and communications interface 614. Received program code may be executed by data processor 607 as it is received and/or stored in the shown storage device or in or upon any other non-volatile storage for later execution. Computer system 6A00 may communicate through a data interface 633 to a database 632 on an external data repository 631. Data items in a database can be accessed using a primary key (e.g., a relational database primary key).

The processing element partition 601 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 607. Some embodiments include one or more special-purpose hardware components (e.g., power control, logic, sensors, transducers, etc.). A module may include one or more state machines and/or combinational logic used to implement or facilitate the performance characteristics of systems for rendering high resolution images using image tiling and hierarchical image tile storage structures.

Various implementations of the database 632 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of rendering high resolution images using image tiling and hierarchical image tile storage structures). Such files or records can be brought into and/or stored in volatile or non-volatile memory.

Figure 6B:
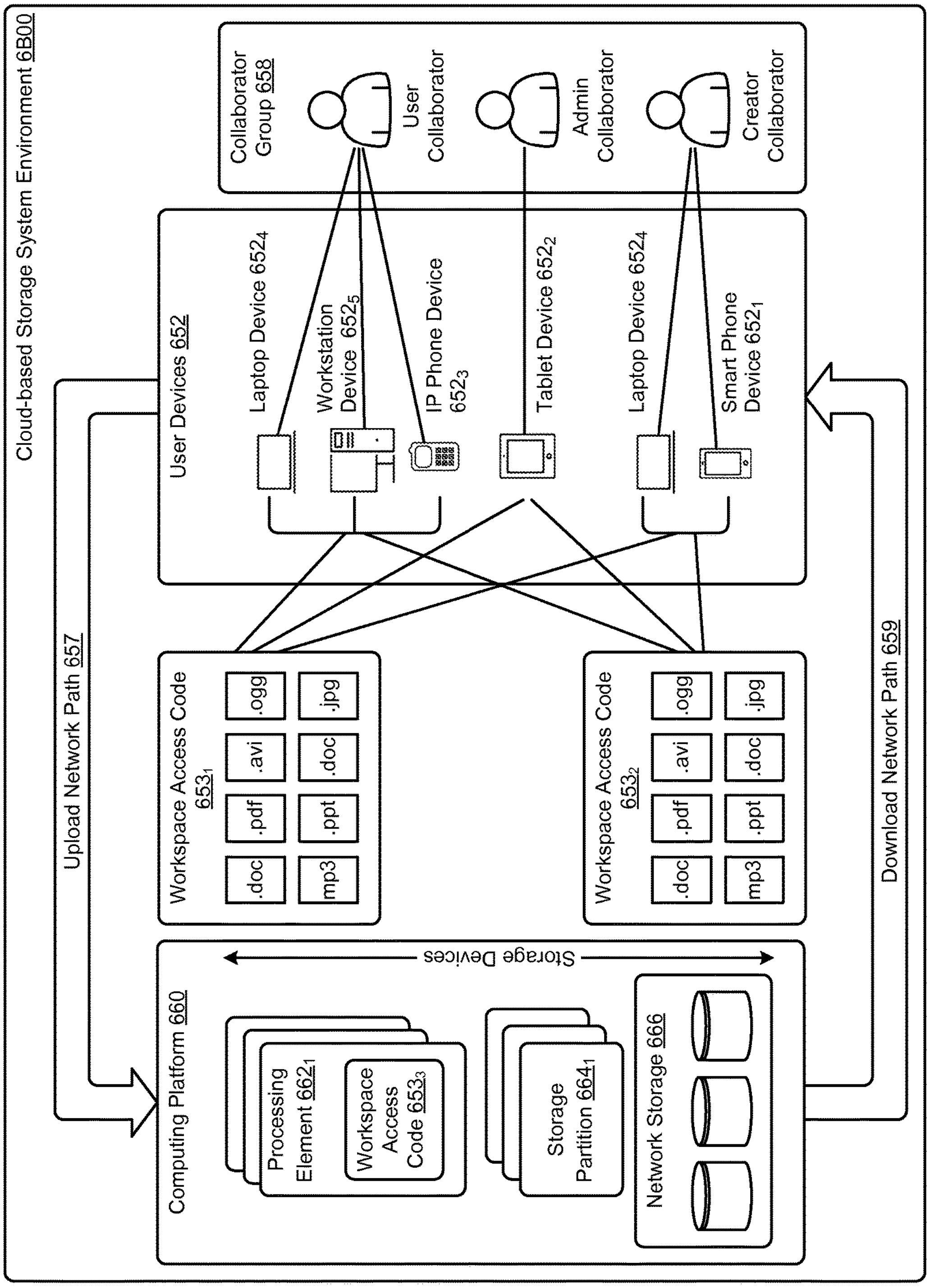

FIG. 6B depicts a block diagram of an instance of a cloud-based storage system environment 6B00. Such a cloud-based environment supports access to workspaces through the execution of workspace access code (e.g., workspace access code $\mathbf{653}_1$ and workspace access code $\mathbf{653}_2$. Workspace access code can be executed on any of the shown user devices 652 (e.g., laptop device $\mathbf{652}_4$, workstation device $\mathbf{652}_5$, IP phone device $\mathbf{652}_3$, tablet device $\mathbf{652}_2$, smart phone device $\mathbf{652}_1$, etc.). A group of users can form a collaborator group 658, and a collaborator group can be comprised of any types or roles of users. For example, and as shown, a collaborator group can comprise a user collaborator, an administrator collaborator, a creator collaborator, etc. Any user can use any one or more of the user devices, and such user devices can be operated concurrently to provide multiple concurrent sessions and/or other techniques to access workspaces through the workspace access code.

A portion of workspace access code can reside in and be executed on any user device. Also, a portion of the workspace access code can reside in and be executed on any computing platform (e.g., computing platform 660), including in a middleware setting. As shown, a portion of the workspace access code (e.g., workspace access code $\mathbf{653}_3$) resides in and can be executed on one or more processing elements (e.g., processing element $\mathbf{662}_1$). The workspace access code can interface with storage devices such the shown networked storage 666. Storage of workspaces and/or any constituent files or objects, and/or any other code or scripts or data can be stored in any one or more storage partitions (e.g., storage partition $\mathbf{664}_1$). In some environments, a processing element includes forms of storage, such as RAM and/or ROM and/or FLASH, and/or other forms of volatile and non-volatile storage.

A stored workspace can be populated via an upload (e.g., an upload from a user device to a processing element over an upload network path 657). One or more constituents of a stored workspace can be delivered to a particular user and/or shared with other particular users via a download (e.g., a download from a processing element to a user device over a download network path 659).

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings to be regarded in an illustrative sense rather than in a restrictive sense.

What is claimed is:

1. A method comprising:

receiving, by a cloud-based storage system, at least one image file associated with an image to be accessed by two or more user devices, wherein the image has a native image size;

generating a plurality of image tile files associated with one or more image tiles for storage in a multi-level hierarchical file storage structure, the multi-level hierarchical file storage structure comprising a root folder, a plurality of parent folders that all correspond to a first zoom level and a plurality of child folders that all correspond to a second zoom level, wherein the plurality of child folders descend directly from the plurality of parent folders and the plurality of parent folders descend directly from the root folder, wherein all parent folders that are direct children of the root folder are directed to the first zoom level and all child folders that are direct children of a parent folder are directed to the second zoom level, wherein the second zoom level is different than the first zoom level, wherein particular ones of the one or more image tiles correspond to respective particular portions of the image by following a naming convention pertaining to respective tile position;

storing the plurality of image tile files in the multi-level hierarchical file storage structure based at least in part on a plurality of zoom levels, wherein one or more directories limit a number of the image tile files in a directory to a threshold;

identifying a user device;

receiving one or more image display attributes from the user device;

selecting a subset of the one or more image tiles, the subset of the one or more image tiles selected based at least in part on the one or more image display attributes; and delivering a portion of the plurality of image tile files to the user device, the portion of the plurality of image tile files corresponding to the subset of the one or more image tiles.

2. The method of claim 1, wherein one or more of the respective tile positions is described by a quadrant location and one or more subdivision levels.

3. The method of claim 2, further comprising generating a filename and one or more directories associated with the plurality of image tile files, wherein the filename is based at least in part on the quadrant location, and the one or more directories is based at least in part on the one or more subdivision levels.

4. The method of claim 1, wherein the zoom level corresponds to one or more levels in a resolution range, wherein the resolution range is based at least in part on the native image size.

5. The method of claim 4, wherein the one or more zoom levels are related by a factor of 2.

6. The method of claim 1, further comprising:

delivering one or more software instructions configurable to be executed at the user device.

7. The method of claim 6, wherein the display attributes comprise at least one of an x-coordinate, a y-coordinate, a zoom setting, a zoom-in command, a zoom-out command, and a pan command.

8. The method of claim 1, wherein the root folder comprises a single tile file that correlates to no zoom.

9. The method of claim 6, further comprising arranging the second portion of the plurality of image tile files for display on the user device, the arranging responsive to executing some of the one or more software instructions.

10. The method of claim 1, wherein the threshold limits the number of files in a directory to 4.

11. A computer program product, embodied in a non-transitory computer readable medium, the non-transitory computer readable medium having stored thereon a sequence of instructions which, when executed by a processor causes the processor to execute a process, the process comprising:

receiving, by a cloud-based storage system, at least one image file associated with an image to be accessed by two or more user devices, wherein the image has a native image size;

generating a plurality of image tile files associated with one or more image tiles for storage in a multi-level hierarchical file storage structure, the multi-level hierarchical file storage structure comprising a root folder, a plurality of parent folders that all correspond to a first zoom level and a plurality of child folders that all correspond to a second zoom level, wherein the plurality of child folders descend directly from the plurality of parent folders and the plurality of parent folders descend directly from the root folder, wherein all parent folders that are direct children of the root folder are directed to the first zoom level and all child folders that are direct children of a parent folder are directed to the second zoom level, wherein the second zoom level is different than the first zoom level, wherein particular ones of the one or more image tiles correspond to respective particular portions of the image by following a naming convention pertaining to respective tile position;

storing the plurality of image tile files in the multi-level hierarchical file storage structure based at least in part on a plurality of zoom levels, wherein one or more directories limit a number of the image tile files in a directory to a threshold;

identifying a user device;

receiving one or more image display attributes from the user device;

selecting a subset of the one or more image tiles, the subset of the one or more image tiles selected based at least in part on the one or more image display attributes; and delivering a portion of the plurality of image tile files to the user device, the portion of the plurality of image tile files corresponding to the subset of the one or more image tiles.

12. The computer program of claim 11, wherein one or more of the respective tile positions is described by a quadrant location and one or more subdivision levels.

13. The computer program of claim 12, further comprising instructions for generating a filename and one or more directories associated with the plurality of image tile files, wherein the filename is based at least in part on the quadrant location, and the one or more directories is based at least in part on the one or more subdivision levels.

14. The computer program of claim 11, wherein the zoom level corresponds to one or more levels in a resolution range, wherein the resolution range is based at least in part on the native image size.

15. The computer program of claim 14, wherein the one or more zoom levels are related by a factor of 2.

16. The computer program of claim 11, further comprising instructions for:

delivering one or more software instructions configurable to be executed at the user device.

17. The computer program of claim 16, wherein the display attributes comprise at least one of an x-coordinate, a y-coordinate, a zoom setting, a zoom-in command, a zoom-out command, and a pan command.

18. The computer program of claim 11, wherein the root folder comprises a single tile file that correlates to no zoom.

19. A cloud-based storage system comprising:

a processor;

a memory comprising computer code executed using the processor, in which the computer code comprises program code to perform:

receiving, by a cloud-based storage system, at least one image file associated with an image to be accessed by two or more user devices, wherein the image has a native image size;

generating a plurality of image tile files associated with one or more image tiles for storage in a multi-level hierarchical file storage structure, the multi-level hierarchical file storage structure comprising a root folder, a plurality of parent folders that all correspond to a first zoom level and a plurality of child folders that all correspond to a second zoom level, wherein the plurality of child folders descend directly from the plurality of parent folders and the plurality of parent folders descend directly from the root folder, wherein all parent folders that are direct children of the root folder are directed to the first zoom level and all child folders that are direct children of a parent folder are directed to the second zoom level, wherein the second zoom level is different than the first zoom level, wherein particular ones of the one or more image tiles correspond to respective particular portions of the image by following a naming convention pertaining to respective tile position;

storing the plurality of image tile files in the multi-level hierarchical file storage structure based at least in part on a plurality of zoom levels, wherein one or more directories limit a number of the image tile files in a directory to a threshold;

identifying a user device;

receiving one or more image display attributes from the user device;

selecting a subset of the one or more image tiles, the subset of the one or more image tiles selected based at least in part on the one or more image display attributes; and delivering a portion of the plurality of image tile files to the user device, the portion of the plurality of image tile files corresponding to the subset of the one or more image tiles.

20. The cloud-based storage system of claim 19, further comprising instructions for generating a filename and one or more directories associated with the plurality of image tile files, wherein the filename is based at least in part on a quadrant location, and the one or more directories is based at least in part on one or more subdivision levels.

* * * * *